United States Patent Office 3,240,620
Patented Mar. 15, 1966

3,240,620
ADHESION OF VINYL RESINS TO NYLON OR OTHER SYNTHETIC FIBROUS MATERIALS
Everett C. Atwell, Greensboro, N.C., assignor to Burlington Industries, Inc., Greensboro, N.C., a corporation of Delaware
No Drawing. Filed Aug. 12, 1960, Ser. No. 49,179
10 Claims. (Cl. 117—72)

The present invention relates to improving the adhesion of vinyl resin film to synthetic linear polyamides, polyethylene terephthalate, and other synthetic polymeric fibrous materials such as Orlon and Acrilan.

Plasticized vinyl resin films such as plasticized polyvinyl chloride and vinyl chloride-vinyl acetate copolymer films, like many other materials, have poor adhesion to polyethylene terephthalate fibers such as Dacron and synthetic linear polyamide fibers known as nylon. Thus, for example, a 5 oz./sq. yd. nylon fabric covered with a vinyl film and fused under heat and pressure (e.g. 380° F. and 125 p.s.i.) develops an adhesion of only 3–4 pounds per inch of width. Similarly, the adhesion of a vinyl film spread on a 5 oz./sq. yd. Dacron fabric and fused under heat and pressure is only about 5.5 pounds per inch of width. This is less than the adhesion necessary for many commercial applications where laminates of vinyl resin with nylon and/or Dacron would be desirable.

Numerous proposals have been made for the purpose of improving the bond between vinyl resins and synthetic textile materials of the type discussed above. One highly desirable process is described in my copending application S.N. 678,519, filed August 16, 1957, and now issued as U.S. Patent 2,961,343 the subject matter of which is incorporated herein by reference. According to said S.N. 678,519, adhesion between vinyl resins and synthetic textile material is improved to a valuable degree by using a bonding composition or primer comprising an aqueous dispersion of resorcinol-formaldehyde condensation product and a polyvinyl chloride or vinyl chloride-vinyl acetate copolymer latex. When nylon fabric, for example, is primed with this resole/latex composition according to S.N. 678,519, adhesions of the order of 12–18 pounds per inch width are obtained in contrast to the 3–4 pounds adhesion when the vinyl resin and the same nylon fabric are joined directly without primer. In the case of Dacron, the adhesion is improved to 8 pounds per inch width. The degree of improvement will necessarily vary depending on such factors as the percentage add-on of the bonding composition and the weight and construction of the base fabric, lower adhesions being obtainable as the fabric surface approaches a plane surface.

Another desirable bonding process is described in the continuation-in-part of said Serial No. 678,519, filed on July 15, 1960, under Serial No. 42,956, now U.S. Patent 3,030,230, involving the use of a bonding composition or primer comprising the partially condensed resorcinol-formaldehyde reaction product and a butadiene-acrylonitrile copolymer latex. The subject matter of said continuation-in-part is also incorporated herein by reference.

While results obtained with the procedures described in Serial No. 678,519 and said continuation-in-part thereof, are highly desirable and useful, the principal object of the present invention is to provide certain unique and novel extensions thereof whereby even more outstanding bonding effects are obtained between vinyl resins, such as plasticized polyvinyl chloride and vinyl chloride-vinyl acetate copolymers, and synthetic polymeric materials. Other objects will also be hereinafter apparent from the detailed description which follows.

The improved results of the present invention are realized by the combined use of two specific primers which give an unexpectedly high bonding effect. One of these primers may be a resole/latex bonding composition as described in Serial No. 678,519 or said continuation-in-part application wherein the ratio of resole to latex solids is within the range of about 1:12 to about 1:2.5 and the latex is selected from the group consisting of polyvinyl chloride latex, vinyl chloride-vinyl acetate copolymer latex and acrylonitrile-butadiene copolymer rubber latex. The other primer comprises an organic polyisocyanate such as methylene bis (4-phenyl-isocyanate).

The reasons for the unique results obtained herein are not fully understood. However, it is apparent that the dual primers are mutually adhesive and coact in some unusual way to give a degree of bonding which is significantly in excess of the expected additive effect based on the use of the primers separately. Thus, for example, the process of Serial No. 678,519 using a bonding composition containing polyvinyl chloride latex, gives an adhesion between a woven nylon fabric and vinyl resin of 19 pounds per inch width, while priming the same fabric with methylene bis (4-phenylisocyanate) gives an adhesion of only 1.8 pounds per inch width to the vinyl resin. In contrast, however, the combination of a first primer comprising methylene bis (4-phenylisocyanate) or some other similar isocyanate, and a second primer comprising the binding composition of Serial No. 678,519 raises the adhesion between this same nylon fabric and the vinyl resin film to 25 pounds per inch. An even greater improvement is shown when a woven Dacron fabric of similar construction is treated according to the invention.

As indicated above, methylene bis (4-phenylisocyanate) is a typical polyisocyanate suitable for priming Dacron or nylon according to the invention. Monoisocyanates are unsatisfactory but other polyisocyanates which may be used are polymethylene polyphenyl polyisocyanate having the formula:

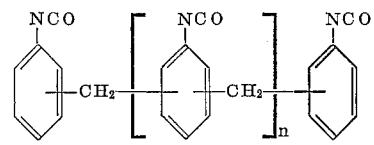

wherein $n$ is an integer, e.g. the product known as PAPI-1 (Carwin Company) in which $n$ has an average value of 1; Mobay's toluene diisocyanate polymer Mondur CB–60; triphenylmethane triisocyanate (Mondur TM); 3,3-di-methoxyl-4,4'-biphenylene diisocyanate; and p-p'-diphenylmethane diisocyanate (Mondur MO).

The isocyanate may be applied to the textile material as a solution in moisture-free organic solvents, e.g. chlorinated aromatics such as monochloro benzene. While the amount of isocyanate can be widely varied, it is usually desirable to apply between 2 and 6% thereof, based on the weight of dry textile material.

As the second primer, any of the aqueous resole/latex compositions described in Serial No. 678,519, or the continuation-in-part thereof mentioned above, may be used herein. As noted, these compositions are characterized by a resole to latex solids ratio in the range of about 1:12 to about 1:2.5. The molecular ratio of resorcinol to formaldehyde in the resole will be approximately 1:1.2 to 1:2.75. Additionally, it is possible to modify these compositions to include an organic solvent although organic solvent-free aqueous compositions are preferred.

After the polyisocyanate has been applied as the first primer, the treated material is dried for solvent removal prior to application of the second primer. Usually, the material is heated until just dry using temperatures between 200–300° F.

The adhesion of the dried single primed material to vinyl resin films shows little or no improvement over the adhesion of the same fabric without the isocyanate treatment. However, at this stage, the dried isocyanate-treated material is tack-free and may be rolled up and stored without need for subsequent reactivation of the primer and without detriment to the working properties of the material.

The dried single primed material may be treated, either directly after the isocyanate treatment or after storage, with the resole-latex primer in the manner described in Serial No. 678,519 or the continuation-in-part thereof, e.g. by dipping, padding or spraying.

The amount of resole/latex primer deposited on the material will vary depending on the weight and construction of the fibrous material and other factors. In the case of nylon fabric, for example, the amount of add-on solids to be applied will usually fall within the range of 5 to 15% by weight of the fabric. The specific amount of add-on solids necessary to give maximum mutual bonding in any given situation will vary and must be determined for the given bonding composition and fibrous material involved.

After impregnation, the water should be removed from the goods by drying. Particular attention must be directed to carrying out this drying operation under such conditions as to avoid cross-linking of the resole/latex bonding composition at this stage. Various drying temperatures may be used so long as the fibrous material is not heated significantly beyond the point where it is dry. Thus, for example, in a continuous drying apparatus, drying air having any desired temperature may be used to remove water from the fibrous material. However, the speed of travel through the dryer must be regulated so that the fibrous material leaving the drying area is just dry and preferably has not reached a temperature in excess of 230° F. Should the speed of drying be so slow as to permit the fibrous material to rise to a level of, for example, 270–300° F., cross-linking of the bonding composition or finish within itself and to the reactive sites of the fiber will take place thereby prematurely converting the resole to the insoluble, infusible state in which condition it has considerably lower bonding affinity for the vinyl resin film.

The dried, dual primed fabric or other form of fibrous material, prepared in the manner described above, is characterized by its non-tacky nature and can be rolled up and stored for long periods of time without losing its bonding affinity for the vinyl film. As will be appreciated, this represents an outstanding advantage since the dried fibrous material can be readily stored until the vinyl film is to be applied thereto. A unique feature of the dried material is that, even after long storage, no reactivation of the treated fabric surface is necessary for effective bonding with the vinyl film. This is in contrast to known adhesive treated fabrics wherein reactivation, for example, by solvent treatment or water, is essential to effect bonding after storage.

The vinyl film may be applied to the dried dual primed material in any conventional fashion. This may involve dipping, knife spreading or the like in the case of vinyl organosols and plastisols or laminating using a self-supporting vinyl sheet. To obtain an effective bond, the cloth or other fibrous material, with the vinyl resin applied thereto, should be subjected to a temperature sufficiently high to melt the vinyl resin and cause the same to fuse to the treated fibers. It is in this fusing operation that the resole is cross-linked to effect the desired bond. The fusing temperature for unsupported vinyl sheeting usually runs between 300° and 350° F. and for organosols, plastisols or other types of spread films, between 350° and 390° F., depending on the composition of the vinyl film, e.g. the nature of the polymer itself, the amount and type of plasticizer, filler, etc., included therein. The application of pressure during the fusing operation, particularly in the case of unsupported vinyl sheeting, may also be desirable to provide optimum bonding. In any event, adhesions of the order of 6 to 7 times greater than the adhesion obtainable without the use of any primer, result from the use of the dual primers of the invention.

The invention is illustrated, but not limited, by the following examples wherein parts and percentages are by weight unless otherwise stated:

EXAMPLE I

This example describes the preparation of a suitable resole/latex composition suitable for use herein as the second primer.

*Resole/latex primer*

PART A

| | Parts |
|---|---|
| Resorcinol | 5.1 |
| 37% formaldehyde | 6.5 |
| NaOH flakes | .15–.30 |
| Water | 110 |
| Approximately | 122 |

PART B

| | Parts |
|---|---|
| Resin master (Part A), approximately | 122 |
| 42% butadiene-acrylonitrile copolymer latex (Hycar 1571) | 181 |
| 10% Igepal Co-880 | 9.4 |
| 20% Dow Antifoam B | 10 |
| Water | 260 |
| Total | 582.4 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The Hycar 1571 was measured into a mixing tank with stirring. The Igepal solution was added followed by the antifoam solution. The water and resin solution (Part A) were then slowly added. The resulting dispersion was ready for immediate use but may be stored for a limited time at room temperature or for prolonged periods of time under refrigeration.

EXAMPLE II

The resole/latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution were added 4.3 parts of 37% formaldehyde and 108 parts of water, the water being added first, with agitation. The resulting mixture was aged for from 1–6 hours at 80–84° F.

After the aging period, a dispersion with Hycar latex was prepared as in Example I.

EXAMPLE III

This example illustrates preparation of a dual primed fabric and the application of a vinyl film thereto according to the present invention.

A first primer was prepared by dissolving sufficient Hylene M–50, i.e. methylene bis (4-phenylisocyanate), in xylene freed from moisture to provide a 10% solids solution.

A piece of 5 oz. Dacron fabric was then padded through the xylene solution so as to leave 3–3.5% Hylene on the cloth. The fabric was dried at 220° F. for 2–3 minutes for solvent removal.

The thus treated fabric was then run through a 20% aqueous dispersion or emulsion of second primer, namely, the product of Example II (prepared from "arrested master") and the pad squeeze rolls. This was done two times so as to get a solids add-on of 12–15%. The fabric was dried after each passage at 220° F.

A vinyl plastisol was then applied by knife spreading and fused for 40 seconds at 380° F. In the fusing operation, the duration of contact between the goods undergoing treatment and hot air in the oven may be controlled by the temperature and speed of the goods through the oven. Should vapors of plasticizer appear at points prior to exit of the goods from the fusing chamber, the speed of travel of the goods should be increased. Otherwise, there might be some degradation of the base fiber itself and unnecessary and undesirable loss of plasticizer through vaporization. On the other hand, if no plasticizer vapor appears, fusing of the plastisol may be incomplete so that maximum bond and film formation are not obtained. Under preferred conditions, the oven temperature and speed of the material through the oven should be so regulated that a small amount of plasticizer vapor is formed just at the oven exit.

The fabric processed in the above manner exhibited adhesion of 20.5 to 25.0 pounds per inch width to the Dacron on a peel test when the test jaws were separated at a rate of 2″ per minute. In contrast, adhesion amounted to only about 5 pounds per inch width when the vinyl plastisol was applied directly to the unprimed fabric.

The vinyl plastisol used in this example comprised 100 parts Geon 121 (a high molecular weight polyvinyl chloride); 50 parts dioctyl phthalate; 15 parts dioctyl sebacate; 15 parts filler; 5 parts titanium dioxide and 3 parts heat and light stabilizer.

EXAMPLE IV

The process of Example III was repeated except that the Dacron fabric was replaced by a 5 oz. nylon fabric to give an adhesion of 22 to 24.5 pounds per inch of width on the peel test. This represented about a four to five fold increase over the adhesion between the vinyl plastisol and the unprimed nylon fabric.

EXAMPLE V

The process of Example III was repeated except that the single primed Dacron fabric was allowed to stand for 6 days at room temperature (68–70° F.) before application of the second primer. The resulting adhesion was 21.5 to 23 pounds per inch of width.

It will be appreciated that the first and second primer compositions and other conditions used in the foregoing examples can be modified or substituted by equivalent materials as hereinabove described to give essentially equivalent improvements in the adhesions of nylon and/or Dacron fibrous material to vinyl resin film. For example, other polyisocyanates may be used in lieu of the methylene bis (4-phenylisocyanate) and the second primer may be any of the bonding compositions described in Serial No. 678,519. Additionally, self-supporting vinyl sheeting may be fused to the fibrous material under heat and pressure instead of using the vinyl plastisol. Thus, the scope of the invention is set forth in the appended claims wherein I claim:

1. A process for improving the bonding characteristics of synthetic fibers to a vinyl resin, said fibers being selected from the group consisting of nylon and polyethylene terephthalate fibers, which comprises impregnating said fibers with a moisture-free, organic solvent solution of a polyisocyanate as the sole essential component and drying the thus impregnated fibers; thereafter impregnating said fibers with an aqueous, essentially organic solvent-free, composition containing both a partially condensed, water-soluble resorcinol-formaldehyde reaction product wherein the ratio of resorcinol to formaldehyde is in the range of about 1:1.2 and 1:2.75 and a latex selected from the group consisting of polyvinyl chloride latex, vinyl chloride-vinyl acetate copolymer latex and acrylonitrile-butadiene copolymer rubber latex in an amount such that the ratio of resorcinol-formaldehyde reaction product to latex solids is within the range of 1:12 to 1:2.5, and drying said fibers at a temperature below 270° F. to give a dry, nontacky product.

2. The process of claim 1, wherein said polyisocyanate is an organic polyisocyanate.

3. The process of claim 2 wherein said polyisocyanate is selected from the group consisting of methylene bis (4-phenylisocyanate); polymethylene polyphenyl polyisocyanate; toluene diisocyanate; triphenylmethane triisocyanate; 3,3-dimethoxyl-4,4′-biphenylene diisocyanate; and p,p′-diphenylmethane diisocyanate.

4. The process of claim 1, wherein the polyisocyanate-impregnated material is dried at 200–300° F. until just dry.

5. The process of claim 1, including the step of applying a layer of polyvinyl resin to the fibrous material, after said treatment with the polyisocyanate and said aqueous composition and drying, and heating the resulting product at an elevated temperature to fuse said resin to said material.

6. The process of claim 1, wherein said latex is an acrylonitrile-butadiene copolymer containing from 25% to 45% by weight of bound acrylonitrile.

7. The process of claim 1, wherein the amount of polyisocyanate applied to said material is between 2 and 6%, based on the weight of the dry material.

8. A synthetic fibrous material having improved bonding affinity for vinyl resins, said material being selected from the group consisting of nylon and polyethylene terephthalate fibers which have been impregnated with an organic solvent solution of polyisocyanate as the sole essential impregnant and dried and then further impregnated with a composition comprising a partially condensed water-soluble resorcinol-formaldehyde reaction product wherein the ratio of resorcinol to formaldehyde is in the range of about 1:1.2 and 1:2.75 and a latex selected from the group consisting of polyvinyl chloride latex, vinyl chloride-vinyl acetate copolymer latex and acrylonitrile-butadiene copolymer latex in an amount such that the ratio of resorcinol-formaldehyde reaction product to latex solids is within the range of 1:12 to 1:2.5 and dried at a temperature below 270° F., to give a dry, nontacky product which is capable of being rolled up and stored while retaining its affinity for vinyl resins.

9. Synthetic fibrous material according to claim 8 having a layer of vinyl resin bonded to said further coating.

10. A fabric having improved bonding affinity for vinyl resin, said fabric comprising polyethylene terephthalate fibers having a dried coating thereon consisting essentially of organic polyisocyanate with a further coating superimposed thereon, said further coating comprising a dried mixture of a partially condensed, water-soluble resorcinol-formaldehyde reaction product wherein the ratio of resorcinol to formaldehyde is in the range of about 1:1.2 and 1:2.75 and a latex selected from the group consisting of polyvinyl chloride latex, vinyl chloride-vinyl acetate latex and butadiene-acrylonitrile latex in amounts such that the ratio of reaction product to latex solids is in the range of 1:12 to 1:2.5, said dual coated fabric being dry and nontacky and capable of being rolled up and stored for subsequent bonding.

References Cited by the Examiner
UNITED STATES PATENTS

| | | | |
|---|---|---|---|
| 2,415,839 | 2/1947 | Neal et al. | 117—150 |
| 2,430,479 | 11/1947 | Pratt et al. | 117—150 |
| 2,556,885 | 6/1951 | Ness | 117—138.8 |
| 2,961,343 | 11/1960 | Atwell | 117—138 |
| 2,981,637 | 4/1961 | Spencer et al. | 117—76 |
| 2,993,825 | 7/1961 | Gage | 117—76 |

FOREIGN PATENTS

| | | |
|---|---|---|
| 167,393 | 4/1956 | Australia. |
| 216,719 | 8/1958 | Australia. |
| 771,121 | 3/1957 | Great Britain. |

JOSEPH B. SPENCER, *Primary Examiner.*

RICHARD D. NEVIUS, WILLIAM D. MARTIN,
*Examiners.*